United States Patent [19]

Chi

[11] Patent Number: 5,244,290
[45] Date of Patent: Sep. 14, 1993

[54] COUPLING FOR SECURING A HANDLEBAR TO A BICYCLE FRAME

[76] Inventor: Yi C. Chi, No. 139-5, An Mei Rd., Mei Shan Village, Hou Li Hsiang, Taichung Hsien, Taiwan

[21] Appl. No.: 937,310

[22] Filed: Aug. 31, 1992

[51] Int. Cl.⁵ ................................................. F16B 7/18
[52] U.S. Cl. ...................................... 403/24; 403/320; 403/51; 411/369; 411/430; 411/432
[58] Field of Search ............ 403/288, 320, 24, 50–51; 411/302, 303, 369, 370, 432, 430; 280/279, 280

[56] References Cited

U.S. PATENT DOCUMENTS

| | | | |
|---|---|---|---|
| 2,432,803 | 12/1947 | Rice | 403/51 X |
| 3,399,589 | 9/1968 | Breed | 411/369 X |
| 3,431,811 | 3/1969 | Yonkers | 411/432 |
| 3,547,473 | 12/1970 | Gottschald | 403/50 X |
| 4,960,342 | 10/1990 | Chi | 403/24 |

Primary Examiner—Randolph A. Reese
Assistant Examiner—George D. Spisich
Attorney, Agent, or Firm—Howard C. Miskin

[57] ABSTRACT

A coupling for securing a handlebar to a bicycle frame comprising a bowl engaged on a front fork of the bicycle frame, a compression nut threadedly engaged on the front fork and including an annular groove formed in an upper portion thereof, and a sealing ring including a lower portion engaged in the annular groove of the compression nut and including an annular ring formed in an upper portion thereof for engagement with the front fork in order to form a seal with the front fork.

4 Claims, 1 Drawing Sheet

COUPLING FOR SECURING A HANDLEBAR TO A BICYCLE FRAME

BACKGROUND OF THE INVENTION

1. Field of the Invention

The present invention relates to a coupling, and more particularly to a coupling for securing a handlebar to a bicycle frame.

2. Description of the Prior Art

The closest prior art of which applicant is aware is his prior U.S. Pat. No. 4,960,342 to Chi, filed Mar. 15, 1990, entitled "COUPLING FOR SECURING A HANDLEBAR TO A BICYCLE FRAME". In this patent, a sealing ring is engaged in the upper portion of the compression nut.

The present invention has arisen to provide a novel sealing ring.

SUMMARY OF THE INVENTION

The primary objective of the present invention is to provide a coupling for securing a handlebar to a bicycle frame which includes a novel sealing ring.

In accordance with one aspect of the invention, there is provided a coupling for securing a handlebar to a bicycle frame comprising a bowl engaged on a front fork of the bicycle frame, a compression nut threadedly engaged on the front fork and including an annular groove formed in an upper portion thereof, and a sealing ring including a lower portion engaged in the annular groove of the compression nut and including an annular ring formed in an upper portion thereof for engagement with the front fork in order to form a seal with the front fork.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figures 1, 2:
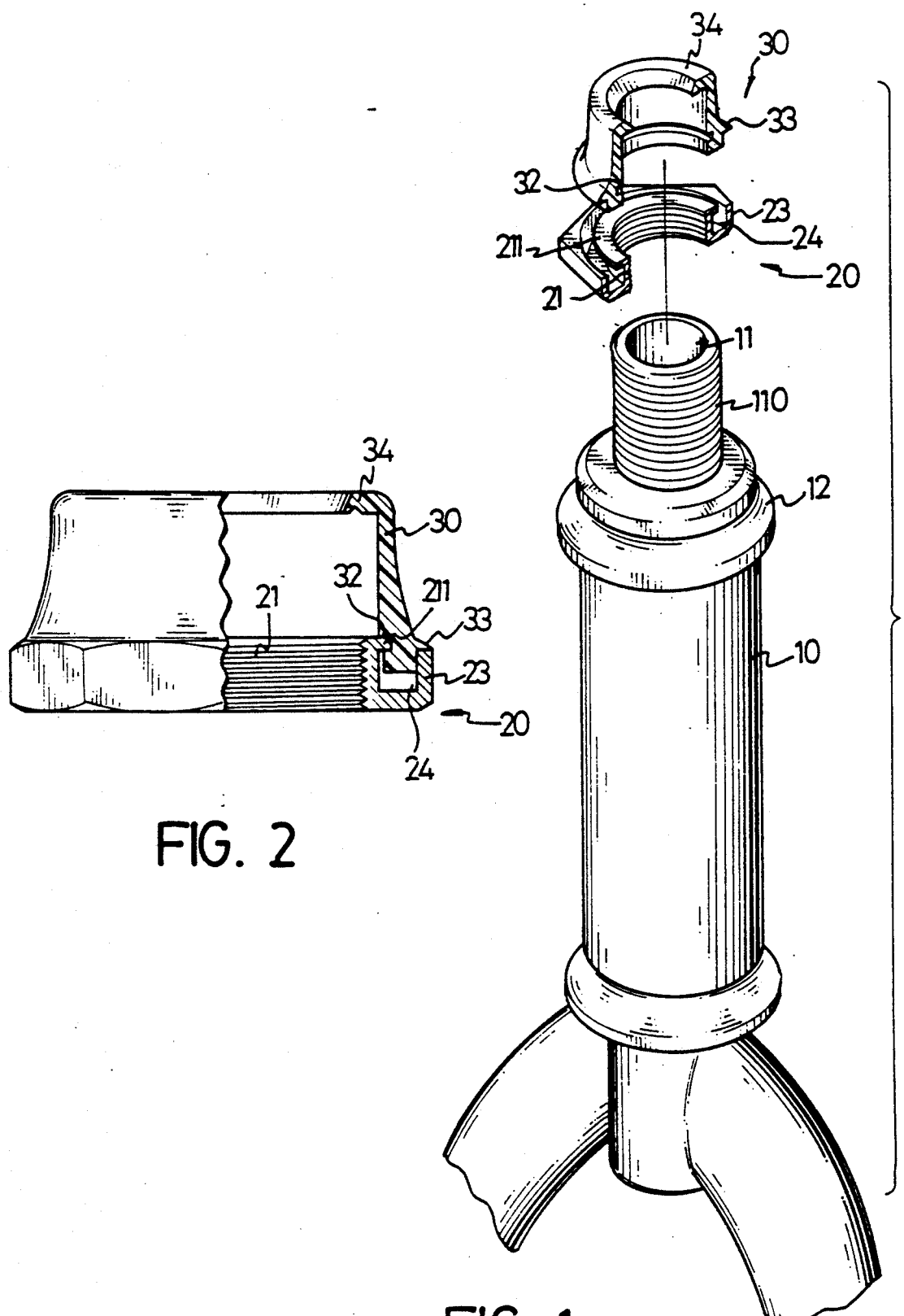
FIG. 1 is a partial exploded view of a coupling in accordance with the present invention.
FIG 2 is a partial cross sectional view of the coupling.

Referring to the drawings, a coupling for securing a handlebar to a bicycle frame in accordance with the present invention comprises generally a bowl 12 engaged on a head tube 10 which is engaged on the front fork 11 of the bicycle, the front fork 11 includes an outer thread 110 formed in the upper portion thereof; a compression nut 20 is threadedly engaged with the outer thread 110 of the front fork 11; and a sealing ring 30 is engaged on the compression nut 20.

The compression nut 20 includes an annular groove 24 formed in the upper portion thereof such that an inner wall 21 and an outer wall 23 are formed, and an annular flange 211 formed on the upper portion of the inner wall 21 and extended radially outwards. The sealing ring 30 includes an annular recess 32 formed in the inner and lower portion thereof for engagement with the annular flange 211 of the compression nut 20, and includes an annular rib 33 extended radially outward from the lower portion thereof for engagement on the outer wall 23 of the compression nut 20, and includes an annular ring 34 formed in the upper portion and extended radially inwards for engagement with the front fork 10 so as to form a seal with the front fork 10.

Accordingly, the coupling in accordance with the present invention includes a novel sealing ring.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A coupling for securing a handlebar to a bicycle frame comprising a bowl engaged on a front fork of said bicycle frame, a compression nut threadedly engaged on said front fork and including an annular groove formed in an upper portion thereof and including an inner wall and an outer wall formed thereon, and an annular flange formed on an upper portion of said inner wall and extend radially outwards of said compression nut, and a sealing ring including a lower portion engaged in said annular groove of said compression nut and including an annular ring formed in an upper portion thereof for engagement with said front fork in order to form a seal with said front fork, said sealing ring including an annular recess formed in an inner portion of said lower portion thereof for receiving said annular flange of said compression nut so as to retain said sealing nut in place, and said sealing ring including an annular rib extended radially outwards from said lower portion thereof for engagement on said outer wall of said compression nut.

2. A coupling for securing a handlebar to a bicycle frame comprising a bowl engaged on a front fork of said bicycle frame, a compression nut threadedly engaged on said front fork and including an annular groove formed in an upper portion thereof so that said compression nut includes an inner wall and an outer wall formed thereon, an annular flange formed on an upper portion of said inner wall and extended radially outwards of said compression nut, and a sealing ring including a lower portion engaged in said annular groove of said compression nut and including an annular recess formed in an inner portion of said lower portion thereof for receiving said annular flange of said compression nut so as to retain said sealing nut in place, and including an annular ring formed in an upper portion thereof for engagement with said front fork in order to form a seal with said front fork, and said sealing ring including an annular rib extended radially outwards from said lower portion thereof for engagement on said outer wall of said compression nut.

3. A coupling for securing a handlebar to a bicycle frame comprising a bow engaged on a front fork of said bicycle frame, a compression nut threadedly engaged on said front fork and including an annular groove formed in an upper portion thereof so as to form an inner wall and an outer wall, and a sealing ring including a lower portion engaged in said annular groove of said compression nut and including an annular rib extended radially outwards from said lower portion thereof for engagement on said outer wall of said compression nut, and including an annular ring formed in an upper portion thereof for engagement with said front fork in order to form a seal with said front fork.

4. A coupling according to claim 3, wherein said compression nut includes an annular flange formed on an upper portion of said inner wall and extended radially outwards of said compression nut, said sealing ring includes an annular recess formed in an inner portion of said lower portion thereof for receiving said annular flange of said compression nut so as to retain said sealing nut in place.

* * * * *